(12) United States Patent
Kutsukake et al.

(10) Patent No.: US 11,381,155 B2
(45) Date of Patent: Jul. 5, 2022

(54) OVERVOLTAGE PROTECTION CIRCUIT AND POWER SUPPLY APPARATUS

(71) Applicant: YOKOGAWA ELECTRIC CORPORATION, Tokyo (JP)

(72) Inventors: Masatoshi Kutsukake, Musashino (JP); Akira Moriyama, Musashino (JP)

(73) Assignee: YOKOGAWA ELECTRIC CORPORATION, Tokyo (JP)

(*) Notice: Subject to any disclaimer, the term of this patent is extended or adjusted under 35 U.S.C. 154(b) by 0 days.

(21) Appl. No.: 16/863,312

(22) Filed: Apr. 30, 2020

(65) Prior Publication Data

US 2020/0358282 A1 Nov. 12, 2020

(30) Foreign Application Priority Data

May 8, 2019 (JP) ............................. JP2019-088611

(51) Int. Cl.
*H02M 1/32* (2007.01)
*H02M 1/00* (2006.01)

(52) U.S. Cl.
CPC ............ *H02M 1/32* (2013.01); *H02M 1/0025* (2021.05)

(58) Field of Classification Search
CPC ...... H02H 7/12; H02H 7/1213; H02H 7/1252; H02M 1/0025; H02M 1/32; H02M 1/36; H02M 3/02; H02M 3/04; H02M 3/10; H02M 3/145; H02M 3/155; H02M 3/156–1588

See application file for complete search history.

(56) References Cited

U.S. PATENT DOCUMENTS

| 5,029,269 | A | * | 7/1991 | Elliott | ............... H02M 3/33546 363/21.1 |
| 6,088,244 | A | * | 7/2000 | Shioya | .............. H02M 3/33523 363/21.07 |
| 9,041,378 | B1 | * | 5/2015 | Lam | ........................ H02M 1/32 323/285 |
| 2006/0256590 | A1 | * | 11/2006 | Yang | ...................... H02H 7/122 363/56.11 |

(Continued)

FOREIGN PATENT DOCUMENTS

| CN | 206517293 | 9/2017 |
| CN | 206559224 | 10/2017 |

(Continued)

OTHER PUBLICATIONS

Machine translation of JP-56121366-A, originally published Sep. 24, 1981. Obtained from https://worldwide.espacenet.com/ on Jun. 7, 2021. (Year: 1981).*

*Primary Examiner* — Fred E Finch, III
(74) *Attorney, Agent, or Firm* — Rankin, Hill & Clark LLP

(57) ABSTRACT

An overvoltage protection circuit includes an error amplifier, which outputs a first command voltage for bringing the output voltage of a converter closer to a first set voltage, and an overvoltage detection circuit, which outputs a second command voltage for bringing the output voltage of the converter closer to a second set voltage that is higher than the first set voltage. The overvoltage protection circuit controls the converter based on the first command voltage and the second command voltage. Noise immunity can be guaranteed even when an overvoltage detection level is set lower than the level of disturbance noise.

8 Claims, 11 Drawing Sheets

(56) References Cited

U.S. PATENT DOCUMENTS

| | | | |
|---|---|---|---|
| 2010/0165683 A1 | 7/2010 | Sugawara | |
| 2011/0133711 A1* | 6/2011 | Murakami | H03K 17/0822 323/282 |
| 2011/0205770 A1* | 8/2011 | Isogai | H02M 1/32 363/78 |
| 2012/0314459 A1* | 12/2012 | Park | H02M 3/33523 363/21.17 |
| 2016/0036340 A1* | 2/2016 | Kikuchi | H02M 1/32 363/21.14 |
| 2016/0261202 A1* | 9/2016 | Kikuchi | H02M 3/33523 |
| 2017/0215240 A1 | 7/2017 | Sawada | |
| 2018/0351470 A1* | 12/2018 | Kikuchi | H02M 3/33592 |

FOREIGN PATENT DOCUMENTS

| | | |
|---|---|---|
| JP | 56-121366 A | 9/1981 |
| JP | 58214922 | 12/1983 |
| JP | 2000-184703 A | 6/2000 |

\* cited by examiner

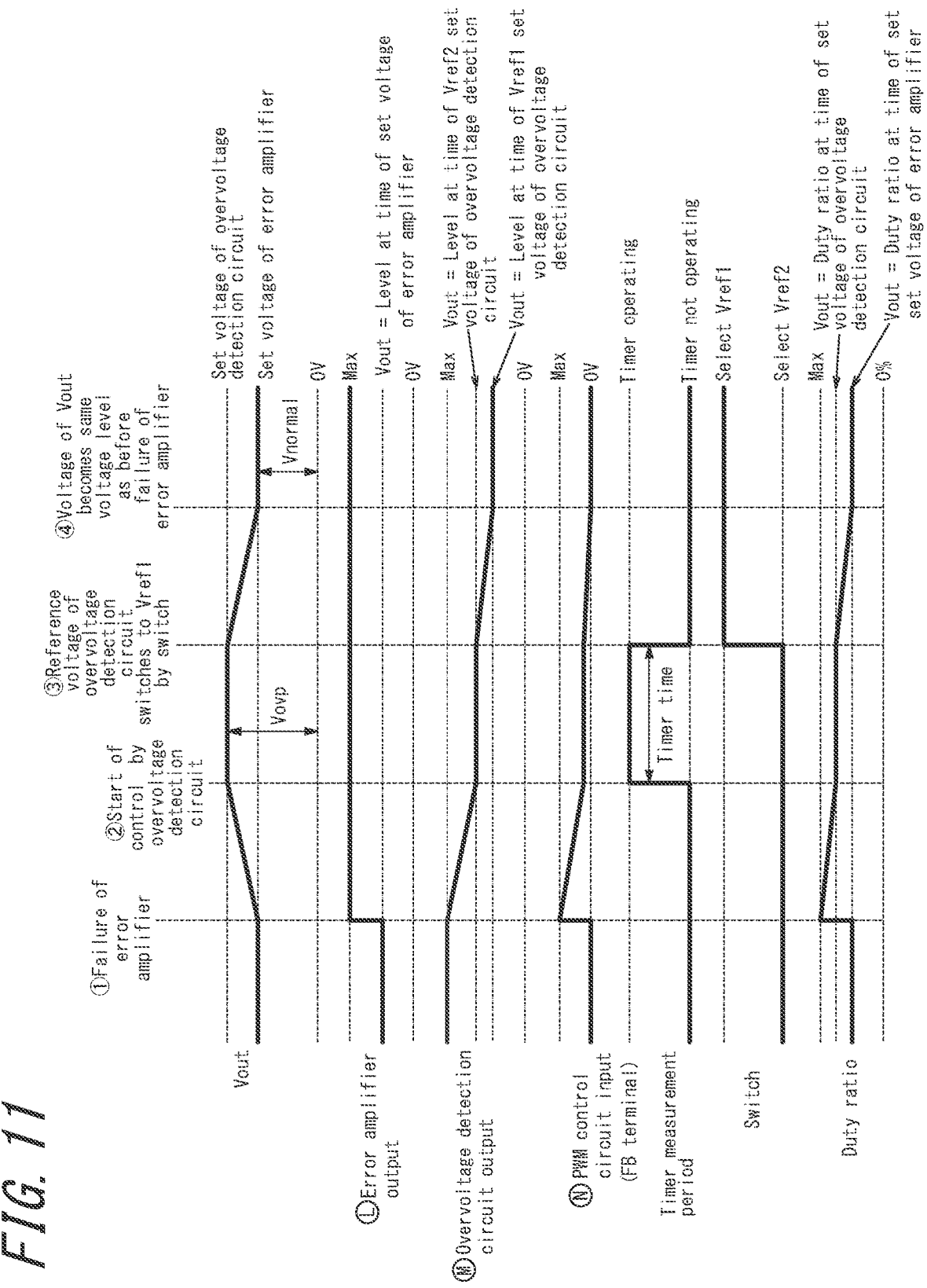

OVERVOLTAGE PROTECTION CIRCUIT AND POWER SUPPLY APPARATUS

CROSS-REFERENCE TO RELATED APPLICATION

The present application claims priority to and the benefit of Japanese Patent Application No. 2019-088611 filed May 8, 2019, the entire contents of which are incorporated herein by reference.

TECHNICAL FIELD

The present disclosure relates to an overvoltage protection circuit and a power supply apparatus.

BACKGROUND

A known power supply apparatus includes an overvoltage protection circuit that suspends output upon entering an overvoltage state in which the output voltage exceeds a predetermined reference value. For example, see patent literature (PTL) 1.

CITATION LIST

Patent Literature

PTL 1: JP2000184703A

SUMMARY

An overvoltage protection circuit according to an embodiment includes an error amplifier configured to output a first command voltage for bringing an output voltage of a converter closer to a first set voltage and an overvoltage detection circuit configured to output a second command voltage for bringing the output voltage of the converter closer to a second set voltage higher than the first set voltage. The overvoltage protection circuit controls the converter based on the first command voltage and the second command voltage.

A power supply apparatus according to an embodiment includes the aforementioned overvoltage protection circuit.

BRIEF DESCRIPTION OF THE DRAWINGS

In the accompanying drawings:

FIG. 11 illustrates an example of operations of the overvoltage protection circuit illustrated in FIG. 10.

DETAILED DESCRIPTION

Figure 1:
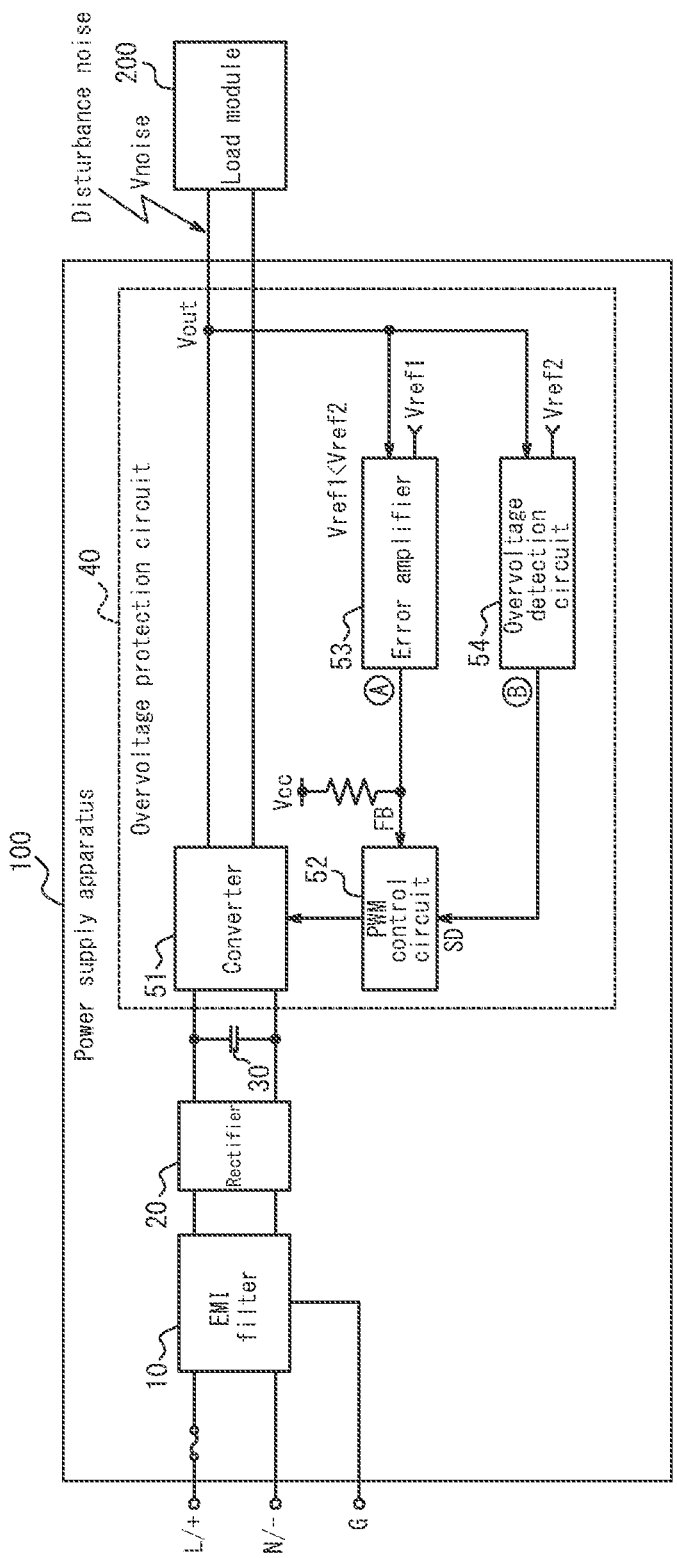
FIG. 1 is a block diagram illustrating a configuration of a power supply apparatus according to a comparative example.

The output voltage of a power supply apparatus may rise due to disturbance noise. To increase noise resistance, it therefore becomes necessary to set an overvoltage detection level of the power supply apparatus higher than the level of disturbance noise. When the noise resistance is increased, however, the circuit in an input unit of a load module connected to the power supply apparatus needs to be designed to withstand a higher voltage than the overvoltage detection level. This leads to problems such as higher cost of parts and enormous circuit size.

It could therefore be helpful to provide an overvoltage protection circuit and a power supply apparatus that can guarantee noise resistance even when the overvoltage detection level is set lower than the level of disturbance noise.

An overvoltage protection circuit according to an embodiment includes an error amplifier configured to output a first command voltage for bringing an output voltage of a converter closer to a first set voltage and an overvoltage detection circuit configured to output a second command voltage for bringing the output voltage of the converter closer to a second set voltage higher than the first set voltage. The overvoltage protection circuit controls the converter based on the first command voltage and the second command voltage.

Noise resistance can thereby be guaranteed even when the overvoltage detection level of the overvoltage detection circuit is set lower than the level of disturbance noise.

In an embodiment, the overvoltage protection circuit may further include a monitoring circuit configured to output an overvoltage detection signal when the second command voltage becomes equal to or less than a predetermined voltage and a timer circuit configured to measure a period during which the monitoring circuit continually outputs the overvoltage detection signal. The overvoltage protection circuit may bring the converter to an emergency stop when the period measured by the timer circuit reaches a predetermined timer time.

A voltage exceeding the allowable input voltage level can thereby be prevented from being applied to a load module when overvoltage failure occurs, which improves reliability.

In an embodiment, the overvoltage protection circuit may further include a monitoring circuit configured to output an overvoltage detection signal when the second command voltage becomes equal to or less than a predetermined voltage and a timer circuit configured to measure a period during which the monitoring circuit continually outputs the overvoltage detection signal. The overvoltage protection circuit may warn an external system when the period measured by the timer circuit reaches a predetermined timer time.

The user can thereby be notified via an external system of failure when overvoltage failure occurs, which improves reliability.

In an embodiment, the overvoltage protection circuit may further include a monitoring circuit configured to output an overvoltage detection signal when the second command voltage becomes equal to or less than a predetermined voltage, and a timer circuit configured to measure a period during which the monitoring circuit continually outputs the overvoltage detection signal. The overvoltage detection circuit may be configured to output a third command voltage for bringing the output voltage of the converter closer to the first set voltage when the period measured by the timer circuit reaches a predetermined timer time. The overvoltage protection circuit may control the converter based on the first command voltage and one of the second command voltage and the third command voltage.

The failure risk of a power supply apparatus and a load module can thereby be reduced when overvoltage failure occurs.

In an embodiment, an output terminal of the error amplifier may be connected to one terminal of a first semiconductor element that has a rectifying function, an output terminal of the overvoltage detection circuit may be connected to one terminal of a second semiconductor element that has a rectifying function, and another terminal of the first semiconductor element and another terminal of the second semiconductor element may be connected to each other. The overvoltage protection circuit may control the converter based on a voltage of the other terminal of the first semiconductor element and the other terminal of the second semiconductor element.

In an embodiment, an output terminal of the error amplifier may be connected to one terminal of a light-emitting element of a first semiconductor element, an output terminal of the overvoltage detection circuit may be connected to one terminal of a light-emitting element of a second semiconductor element, and an output terminal of a light-receiving element of the first semiconductor element and an output terminal of a light-receiving element of the second semiconductor element may be connected to each other. The overvoltage protection circuit may control the converter based on a voltage of the output terminal of the first semiconductor element and the output terminal of the second semiconductor element.

With a simple configuration, the overvoltage protection circuit can thereby control the converter based on the first command voltage outputted by the error amplifier and the second command voltage outputted by the overvoltage detection circuit.

A power supply apparatus according to an embodiment includes the aforementioned overvoltage protection circuit.

Noise resistance can thereby be guaranteed even when the overvoltage detection level of the overvoltage detection circuit is set lower than the level of disturbance noise.

The present disclosure can provide an overvoltage protection circuit and a power supply apparatus that can guarantee noise resistance even when the overvoltage detection level is set lower than the level of disturbance noise.

Embodiments of the present disclosure are described below with reference to the drawings. Many variations to the circuit configuration are possible, such as dividing the output voltage $V_{out}$, changing the dividing ratio of the output voltage $V_{out}$ and setting reference voltages $V_{ref1}$, $V_{ref2}$ to the same value, or changing the operating polarity of an error amplifier/overvoltage detection circuit/pulse width modulation (PWM) control circuit. For the sake of simplicity, however, the following circuit configuration is assumed in the present disclosure.

The output voltage $V_{out}$ is not divided and is inputted directly into an error amplifier and an overvoltage detection circuit.

The error amplifier and overvoltage detection circuit are non-inverting.

A PWM control circuit outputs a signal in a direction to lower the duty ratio of the switching element of a converter when an input voltage to a feedback (FB) terminal decreases.

First, a power supply apparatus according to a comparative example is described. FIG. 1 is a block diagram illustrating a configuration of a power supply apparatus 100 according to a comparative example. The power supply apparatus 100 according to a comparative example includes an electro magnetic interference (EMI) filter 10, a rectifier 20, a smoothing capacitor 30, and an overvoltage protection circuit 40. The overvoltage protection circuit 40 includes a converter 51, a PWM control circuit 52, an error amplifier 53, and an overvoltage detection circuit 54.

The power supply apparatus 100 removes electromagnetic noise with the EMI filter 10 and converts alternating current (AC) power to direct current (DC) power with the rectifier 20. The smoothing capacitor 30 maintains the DC voltage inputted from the rectifier 20 at a constant voltage and outputs the DC voltage to the converter 51.

The overvoltage protection circuit 40 includes a circuit for protecting a load module 200, which is connected to the output of the power supply apparatus 100, when the output voltage of the converter 51 (i.e. the output voltage of the power supply apparatus 100) $V_{out}$ becomes higher than during normal operation due to failure of the error amplifier 53.

The error amplifier 53 controls the level of the output voltage $V_{out}$ of the converter 51 based on a reference voltage $V_{ref1}$.

When the level of the output voltage $V_{out}$ of the converter 51 exceeds a predetermined set voltage, the overvoltage detection circuit 54 detects an overload voltage and outputs a high level. The error amplifier 53 and the overvoltage detection circuit 54 may be a shunt regulator or a differential amplifier.

In accordance with the level of a FB terminal, the PWM control circuit 52 generates a PWM signal for changing the duty ratio of a switching element of the converter 51 and outputs the PWM signal to the converter 51. When a high-level voltage is inputted to a shut down (SD) terminal from the overvoltage detection circuit 54, the PWM control circuit 52 supplies the converter 51 with a signal for setting the duty ratio of the switching element of the converter 51 to 0%. The output voltage $V_{out}$ of the converter 51 thus becomes 0 V.

The converter 51 changes the output voltage $V_{out}$ by turning a switching element on and off in response to the PWM signal inputted from the PWM control circuit 52. Specifically, the converter 51 lowers the duty ratio of the switching element to lower the level of the output voltage $V_{out}$ when the level of the FB terminal of the PWM control circuit 52 is low and raises the duty ratio of the switching element to raise the level of the output voltage $V_{out}$ when the level of the FB terminal of the PWM control circuit 52 is high.

Figure 2:
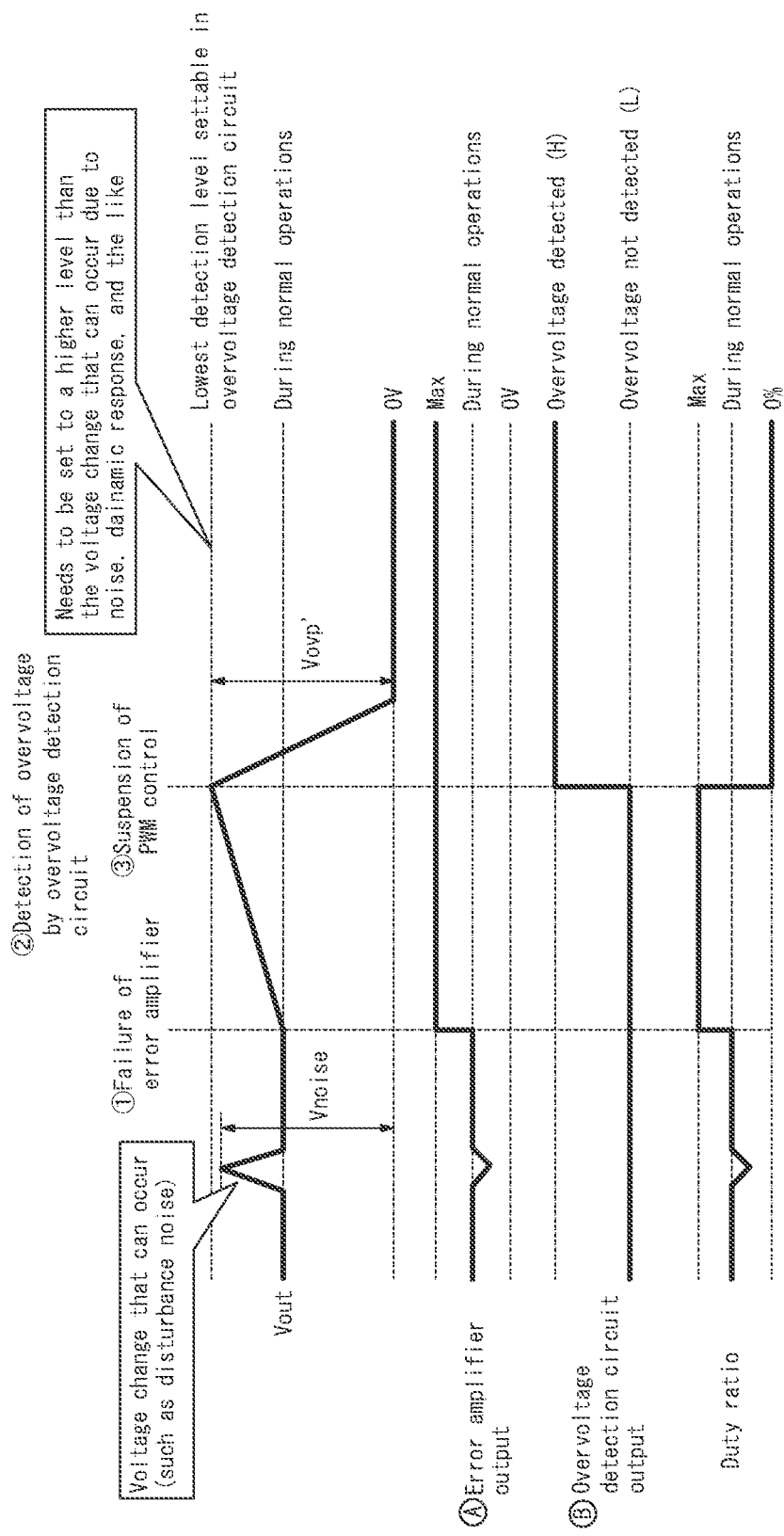
FIG. 2 illustrates an example of operations of the overvoltage protection circuit illustrated in FIG. 1.

FIG. 2 illustrate operations of the overvoltage protection circuit 40. In order from the top, FIG. 2 illustrates the waveform of the output voltage $V_{out}$ of the converter 51, the waveform of the output voltage of the error amplifier 53 (the voltage at the position indicated by letter A in FIG. 1), the waveform of the output voltage of the overvoltage detection circuit 54 (the voltage at the position indicated by letter B in FIG. 1), and the duty ratio controlled by the PWM control circuit 52.

When the error amplifier 53 fails and the output voltage (the voltage at the position indicated by letter A in FIG. 1)

of the error amplifier 53 reaches a maximum (Max), for example, the level of the output voltage $V_{out}$ of the converter 51 rises. In this case, the overvoltage detection circuit 54 detects the overvoltage of the output voltage $V_{out}$ and sets the output voltage of the overvoltage detection circuit 54 (the voltage at the position indicated by letter B in FIG. 1) to a high level. The PWM control circuit 52 receives the high-level signal from the overvoltage detection circuit 54 and outputs a signal for setting the duty ratio of the switching element of the converter 51 to 0%. When the duty ratio reaches 0%, the converter 51 sets the output voltage $V_{out}$ to 0 V.

Even during normal operation of the power supply apparatus 100, the level of the output voltage $V_{out}$ sometimes increases due to disturbance noise, load fluctuation, or the like (simply "disturbance noise" below). To prevent the overvoltage protection circuit 40 from malfunctioning due to this disturbance noise, the level of an overvoltage detection voltage needs to be set higher than the level of the disturbance noise.

In other words, the level of overvoltage detection voltage $V_{ovp}'$ of the overvoltage protection circuit 40 needs to be set to a higher level than the disturbance noise $V_{noise}$, as illustrated in FIG. 2. Therefore, the circuit in an input unit of the load module 200 connected to the power supply apparatus 100 needs to be designed to withstand a higher voltage than the level of the overvoltage detection voltage $V_{ovp}'$ of the overvoltage protection circuit 40 in the power supply apparatus 100. This leads to problems such as higher cost of parts and enormous circuit size. Furthermore, noise resistance and the overvoltage detection level of the overvoltage protection circuit 40 are a tradeoff. Lowering the level of the overvoltage detection voltage $V_{ovp}'$ of the overvoltage protection circuit 40 causes the overvoltage protection circuit 40 to overreact to disturbance noise, and the output voltage $V_{out}$ of the converter 51 more frequently become 0 V. For such reasons, the noise resistance worsens.

An overvoltage protection circuit and a power supply apparatus that can guarantee noise resistance even when the overvoltage detection level is set lower than the level of disturbance noise are described in the present disclosure.

First Embodiment

Figure 3:
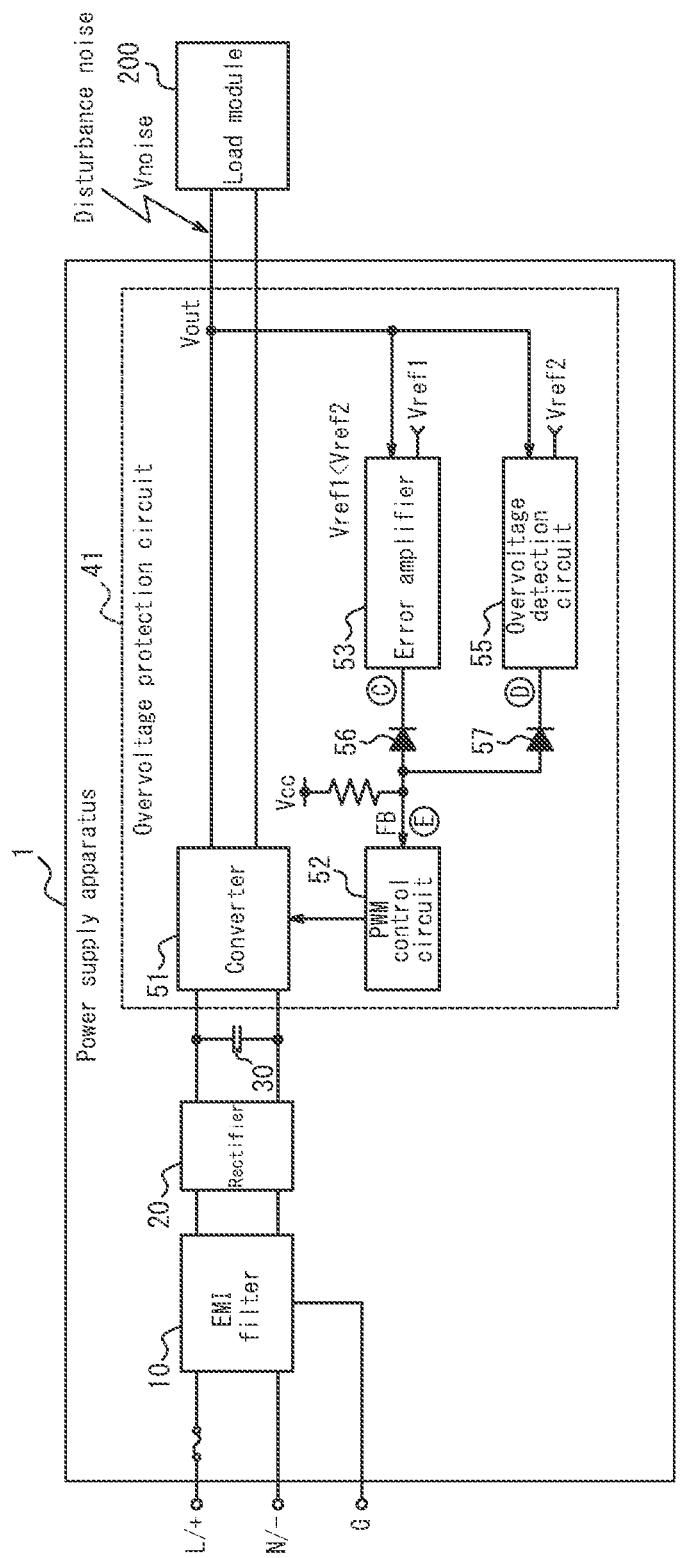
FIG. 3 illustrates an overvoltage protection circuit and a power supply apparatus according to a first embodiment.

FIG. 3 illustrates an overvoltage protection circuit and a power supply apparatus according to a first embodiment. As illustrated in FIG. 3, a power supply apparatus 1 includes an EMI filter 10, a rectifier 20, a smoothing capacitor 30, and an overvoltage protection circuit 41. The overvoltage protection circuit 41 includes a converter 51, a PWM control circuit 52, an error amplifier 53, an overvoltage detection circuit 55, and semiconductor elements 56, 57. The configuration that is the same as the power supply apparatus 100 illustrated in FIG. 1 is labeled with the same reference signs, and a description is omitted as appropriate.

The error amplifier 53 outputs a first command voltage for bringing the output voltage $V_{out}$ of the converter 51 (i.e. the output voltage of the power supply apparatus 1) closer to a first set voltage. The output voltage $V_{out}$ of the converter 51 in FIG. 3 is used as is as the input voltage of the error amplifier 53, but the output voltage $V_{out}$ of the converter 51 may be divided and used as the input voltage of the error amplifier 53. The error amplifier 53 outputs the first command voltage for bringing the voltage inputted from the converter 51 ($V_{out}$ when the output voltage $V_{out}$ of the converter 51 is used as is as the input voltage of the error amplifier 53, and the result of dividing $V_{out}$ when the output voltage $V_{out}$ of the converter 51 is divided and used as the input voltage of the error amplifier 53) closer to a reference voltage $V_{ref1}$.

The output of the conventional overvoltage detection circuit 54 illustrated in FIG. 1 is a logical operation, whereas the output of the overvoltage detection circuit 55 is an analog operation. The overvoltage detection circuit 55 has similar functions to those of the error amplifier 53 and outputs a second command voltage for bringing the output voltage $V_{out}$ of the converter 51 closer to a second set voltage (overvoltage detection voltage) that is higher than the first set voltage.

The output voltage $V_{out}$ of the converter 51 in FIG. 3 is used as is as the input voltage of the overvoltage detection circuit 55, but the output voltage $V_{out}$ of the converter 51 may be divided and used as the input voltage of the overvoltage detection circuit 55. The overvoltage detection circuit 55 outputs the second command voltage for bringing the voltage inputted from the converter 51 ($V_{out}$ when the output voltage $V_{out}$ of the converter 51 is used as is as the input voltage of the overvoltage detection circuit 55, and the result of dividing $V_{out}$ when the output voltage $V_{out}$ of the converter 51 is divided and used as the input voltage of the overvoltage detection circuit 55) closer to a reference voltage $V_{ref2}$.

Here, the reference voltage $V_{ref2}$ of the overvoltage detection circuit 55 is higher than the reference voltage $V_{ref1}$ of the error amplifier 53. The reference voltage $V_{ref1}$ and the reference voltage $V_{ref2}$ may be equivalent, and the dividing ratio of the output voltage $V_{out}$ of the converter 51 may be changed so that the input voltage of the overvoltage detection circuit 55 becomes lower than the input voltage of the error amplifier 53.

The semiconductor elements 56, 57 are diodes in FIG. 3. The error amplifier 53 and the overvoltage detection circuit 55 are connected in parallel. The output terminal of the error amplifier 53 is connected to the FB terminal of the PWM control circuit 52 via the semiconductor element 56, and the output terminal of the overvoltage detection circuit 55 is connected to the FB terminal of the PWM control circuit 52 via the semiconductor element 57. In other words, the output voltage of the error amplifier 53 and the output voltage of the overvoltage detection circuit 55 are compared by the semiconductor elements 56, 57 and resistance. As long as these voltages can be compared, a circuit configuration other than the present circuit configuration may be used.

The PWM control circuit 52 prioritizes control of the command voltage, between the first command voltage outputted by the error amplifier 53 and the second command voltage outputted by the overvoltage detection circuit 55, that sets the output voltage $V_{out}$ of the converter 51 to a lower voltage. For example, the output terminal of the error amplifier 53 is connected to the cathode of the semiconductor element 56, and the output terminal of the overvoltage detection circuit 55 is connected to the cathode of the semiconductor element 57, as illustrated in FIG. 3. The anodes of the semiconductor elements 56, 57 are connected to each other and to the FB terminal of the PWM control circuit 52.

Figure 4:
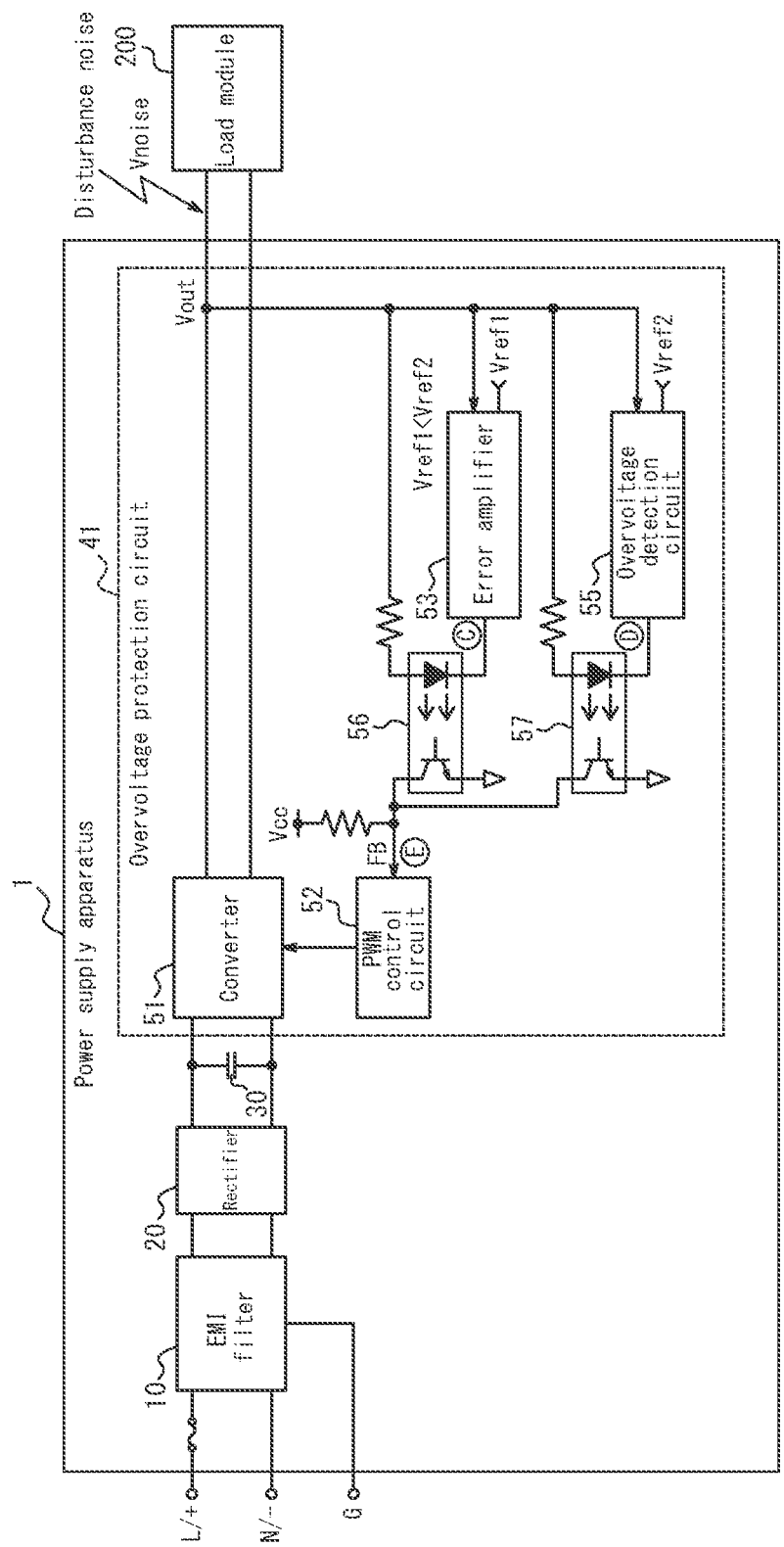
FIG. 4 illustrates a modification to the overvoltage protection circuit and power supply apparatus illustrated in FIG. 3.

FIG. 4 illustrates an overvoltage protection circuit and a power supply apparatus in the case of the semiconductor elements 56, 57 being photocouplers. The input of the semiconductor elements 56, 57 may be the output voltage $V_{out}$ or a constant voltage. In the example in FIG. 4, the output terminal of the error amplifier 53 is connected to the cathode of a light-emitting element of the semiconductor element 56, and the output terminal of the overvoltage detection circuit 55 is connected to the cathode of a light-emitting element of the semiconductor element 57. The output terminal of a light-receiving element of the semiconductor element 56 (a collector in FIG. 4) and the output terminal of a light-receiving element of the semiconductor element 57 (a collector in FIG. 4) are connected to each other and connected to the FB terminal of the PWM control circuit 52.

With the configuration illustrated in FIGS. 3 and 4, the voltage of the FB terminal becomes a level corresponding to whichever of the output voltage of the error amplifier 53 and the output voltage of the overvoltage detection circuit 55 is lower. Accordingly, the overvoltage protection circuit 41 controls the converter 51 based on the lower of the first command voltage outputted by the error amplifier 53 and the second command voltage outputted by the overvoltage detection circuit 55.

If the polarity of the error amplifier 53, the overvoltage detection circuit 55, and the PWM control circuit 52 is reversed, for example, the overvoltage protection circuit 41 may control the converter 51 based on the higher of the first command voltage outputted by the error amplifier 53 and the second command voltage outputted by the overvoltage detection circuit 55.

Figure 5:
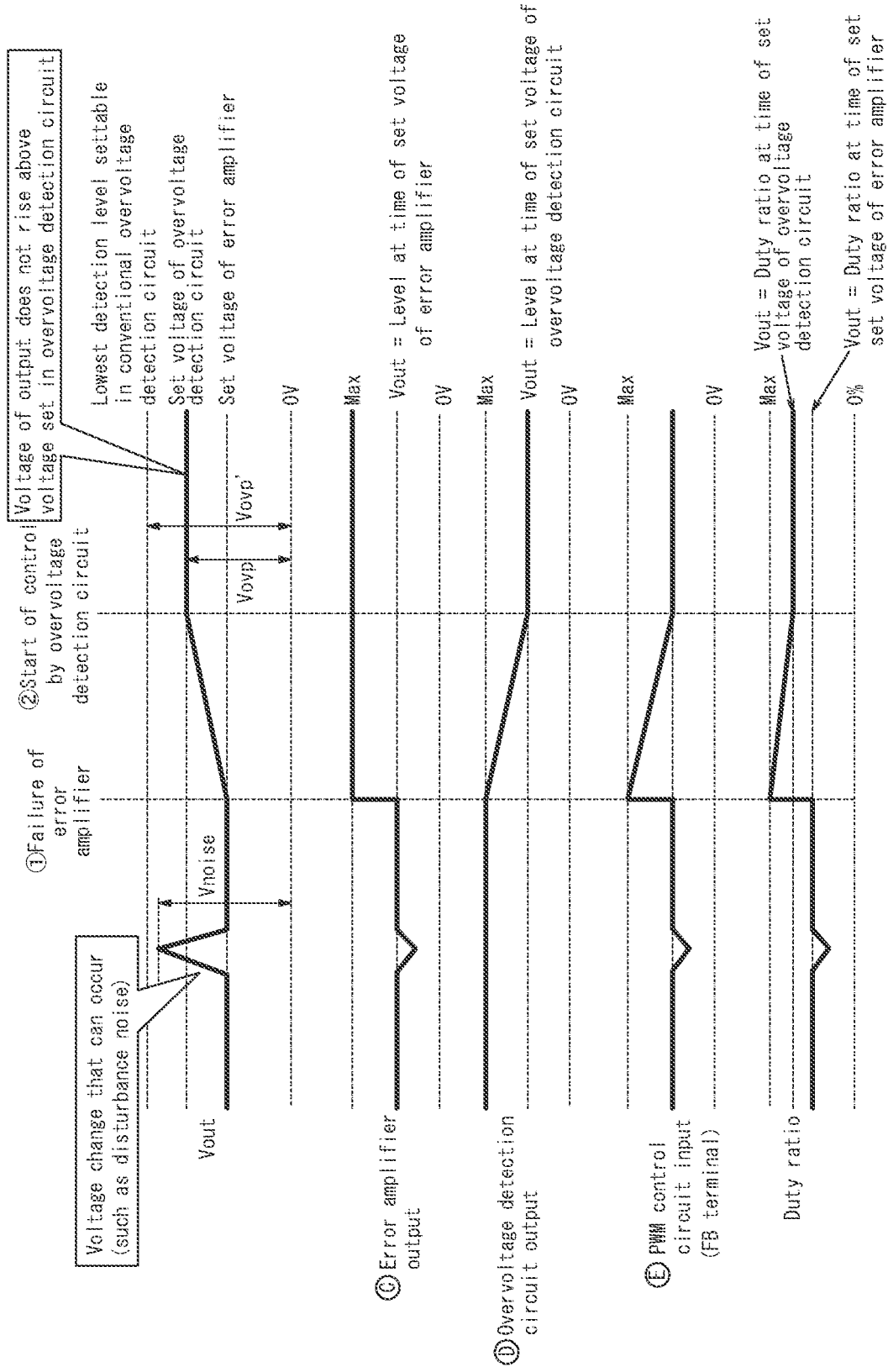
FIG. 5 illustrates an example of operations of the overvoltage protection circuit illustrated in FIGS. 3 and 4.

Next, operations of the overvoltage protection circuit 41 are described with reference to FIG. 5. In order from the top, FIG. 5 illustrates the waveform of the output voltage $V_{out}$ of the converter 51, the waveform of the output voltage of the error amplifier 53 (the voltage at the position indicated by letter C in FIGS. 3 and 4), the waveform of the output voltage of the overvoltage detection circuit 55 (the voltage at the position indicated by letter D in FIGS. 3 and 4), the waveform of the voltage inputted to the FB terminal of the PWM control circuit 52 (the voltage at the position indicated by letter E in FIGS. 3 and 4), and the duty ratio controlled by the PWM control circuit 52.

Since the reference voltage $V_{ref2}$ of the overvoltage detection circuit 55 is set higher than the reference voltage $V_{ref1}$ of the error amplifier 53, PWM control is performed based on the output voltage of the error amplifier 53 when the error amplifier 53 is operating normally.

The input voltage of the error amplifier 53 becomes close to the reference voltage $V_{ref1}$ when the error amplifier 53 is operating normally. Hence, the first command voltage outputted by the error amplifier 53 approaches the level observed when the output voltage $V_{out}$ of the converter 51 is equivalent to the first set voltage of the error amplifier 53. Furthermore, when the error amplifier 53 is operating normally, the input voltage of the overvoltage detection circuit 55 is lower than the reference voltage $V_{ref2}$. Hence, the second command voltage outputted by the overvoltage detection circuit 55 reaches the maximum (Max).

When the error amplifier 53 fails so that the level of the output voltage $V_{out}$ of the converter 51 rises, the level of the output voltage $V_{out}$ exceeds the first set voltage of the error amplifier 53. The semiconductor elements 56, 57 and the resistance compare a voltage C and a voltage D and provide the lower voltage to the input terminal FB of the PWM control circuit 52. Therefore, when the level of the output voltage $V_{out}$ rises to an overvoltage detection voltage $V_{ovp}$, which is the second set voltage of the overvoltage detection circuit 55, the PWM control circuit 52 outputs a signal to manipulate the duty ratio of the switching element of the converter 51 based on the output voltage of the overvoltage detection circuit 55. The converter 51 can thereby suppress the rise in the output voltage $V_{out}$ to the level of the overvoltage detection voltage $V_{ovp}$.

As described above, the overvoltage protection circuit 41 of the first embodiment includes the error amplifier 53, which outputs the first command voltage for bringing the output voltage $V_{out}$ of the converter 51 closer to the first set voltage, and the overvoltage detection circuit 55, which outputs the second command voltage for bringing the output voltage $V_{out}$ of the converter 51 closer to the second set voltage (overvoltage detection voltage $V_{ovp}$) that is higher than the first set voltage. The overvoltage protection circuit 41 controls the converter 51 based on the first command voltage and the second command voltage.

When, as illustrated in FIG. 2, the error amplifier 53 fails and the output voltage $V_{out}$ rises in the conventional overvoltage protection circuit 40 illustrated in FIG. 1, overvoltage protection operations begin at the point when the overvoltage detection voltage $V_{ovp}'$ that is higher than the disturbance noise $V_{noise}$ is detected. By contrast, the power supply apparatus 1 of the first embodiment enables the detection level of the overvoltage protection circuit 41 to be set to the overvoltage detection voltage $V_{ovp}$, which is lower than the conventional overvoltage detection voltage $V_{ovp}'$. Furthermore, when the error amplifier 53 fails and the output voltage $V_{out}$ rises as illustrated in FIG. 5, overvoltage protection operations can begin at the point when the overvoltage detection voltage $V_{ovp}$ that is lower than the disturbance noise $V_{noise}$ is detected. Design restrictions on the input unit of the load module 200 connected to the power supply apparatus 1 can therefore be eased, and benefits such as reduced cost of parts for the input unit of the load module 200 and decreased circuit size can be achieved.

As illustrated in FIG. 5, the overvoltage protection circuit 41 does not suspend the PWM control even when a disturbance noise $V_{noise}$ exceeding the overvoltage detection voltage $V_{ovp}$ set in the overvoltage detection circuit 55 is applied from the outside. The conventional tradeoff between the overvoltage detection level and noise resistance is therefore eliminated, and noise resistance can be guaranteed even when the overvoltage detection level is lowered.

Second Embodiment

Next, an overvoltage protection circuit and a power supply apparatus according to a second embodiment are described. The overvoltage due to failure of the error amplifier 53 can be suppressed in the first embodiment, as described above. Since there is no way to detect whether the error amplifier 53 has failed, however, the power supply apparatus 1 continues to operate. If the overvoltage detection circuit 55 fails so that the level of the output voltage $V_{out}$ rises in this state, then a voltage exceeding the allowable input voltage level might be applied to the load module 200 connected to the power supply apparatus 1. To address this issue, the present embodiment adds, to the configuration of the first embodiment, a function to bring the output voltage $V_{out}$ of the power supply apparatus to an emergency stop when control by the overvoltage detection circuit 55 continues due to failure of the error amplifier 53. The "emergency stop" in the present embodiment may refer to stopping the actual operation of the converter 51, to setting the output voltage $V_{out}$ to 0 V, or to opening the output voltage $V_{out}$. The emergency stop is described below as setting the output voltage $V_{out}$ to 0 V.

Figure 6:
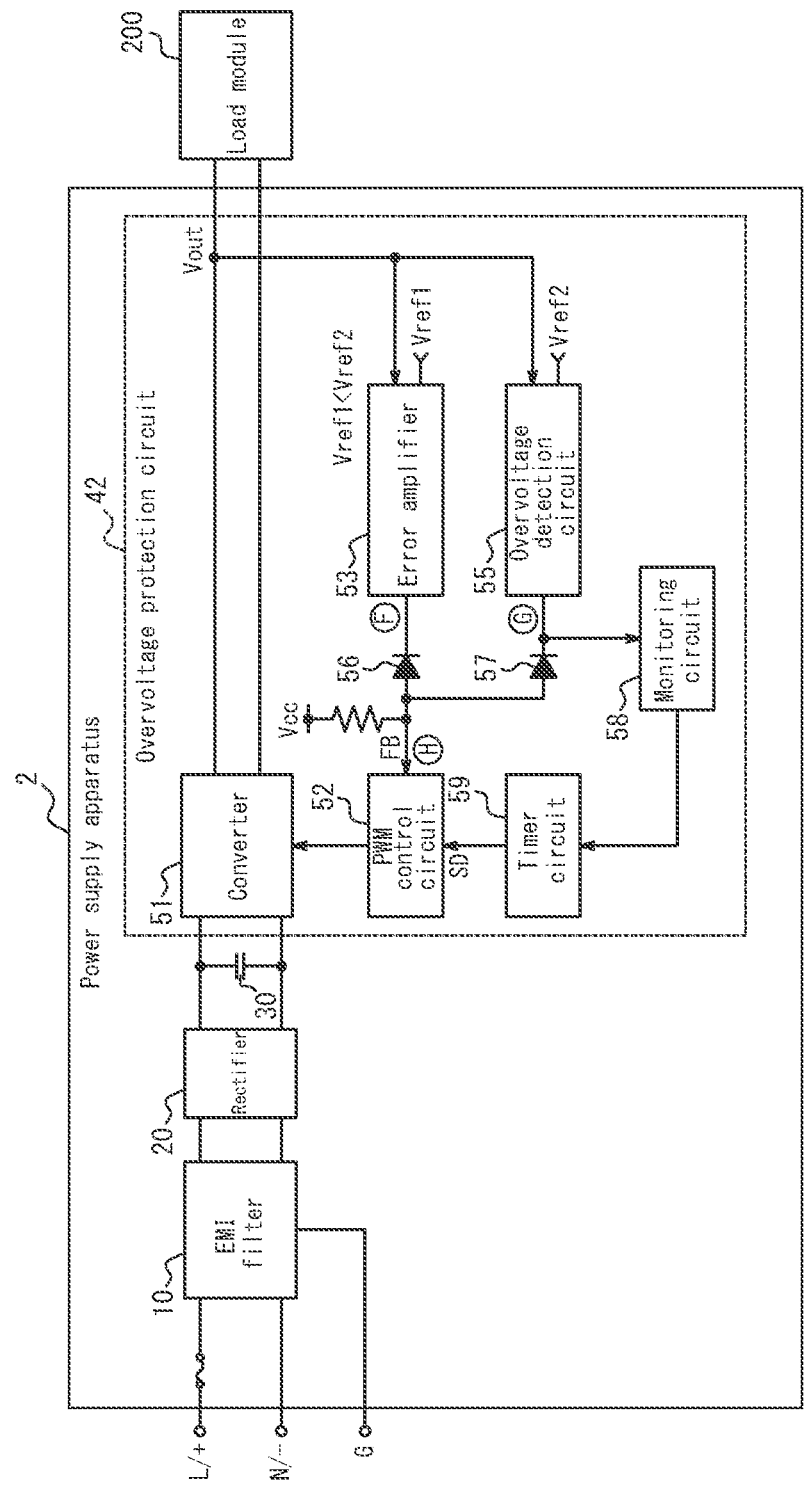
FIG. 6 illustrates an overvoltage protection circuit and a power supply apparatus according to a second embodiment.

FIG. 6 illustrates an overvoltage protection circuit and a power supply apparatus according to the second embodiment. As illustrated in FIG. 6, a power supply apparatus 2 includes an EMI filter 10, a rectifier 20, a smoothing capacitor 30, and an overvoltage protection circuit 42. The overvoltage protection circuit 42 includes a converter 51, a PWM control circuit 52, an error amplifier 53, an overvoltage detection circuit 55, semiconductor elements 56, 57, a monitoring circuit 58, and a timer circuit 59. The present embodiment differs from the first embodiment in that the overvoltage protection circuit 42 additionally includes the monitoring circuit 58 and the timer circuit 59.

The overvoltage detection circuit 55 outputs a second command voltage, for bringing an output voltage $V_{out}$ of the converter 51 (i.e. the output voltage of the power supply apparatus 2) closer to a second set voltage (overvoltage detection voltage $V_{ovp}$), to the semiconductor element 57 and the monitoring circuit 58.

The monitoring circuit 58 monitors the second command voltage inputted from the overvoltage detection circuit 55. When the second command voltage becomes equal to or less than a predetermined voltage, the monitoring circuit 58 outputs a corresponding overvoltage detection signal (such as a high-level voltage signal) to the timer circuit 59.

The timer circuit 59 measures (counts) the period during which the monitoring circuit 58 continually outputs the overvoltage detection signal. When the measured period reaches a predetermined timer time (count value), the timer circuit 59 outputs an operation suspension signal (such as a high-level voltage signal) to the SD terminal of the PWM control circuit 52.

When the operation suspension signal is inputted to the SD terminal from the timer circuit 59, the PWM control circuit 52 outputs a PWM signal that sets the duty ratio of the switching element in the converter 51 to 0%, and the converter 51 sets the output voltage thereof to 0 V. In other words, the overvoltage protection circuit 42 is configured so that when the period measured by the timer circuit 59 reaches a predetermined timer time, the output voltage of the converter 51 reaches 0 V.

Figure 7:
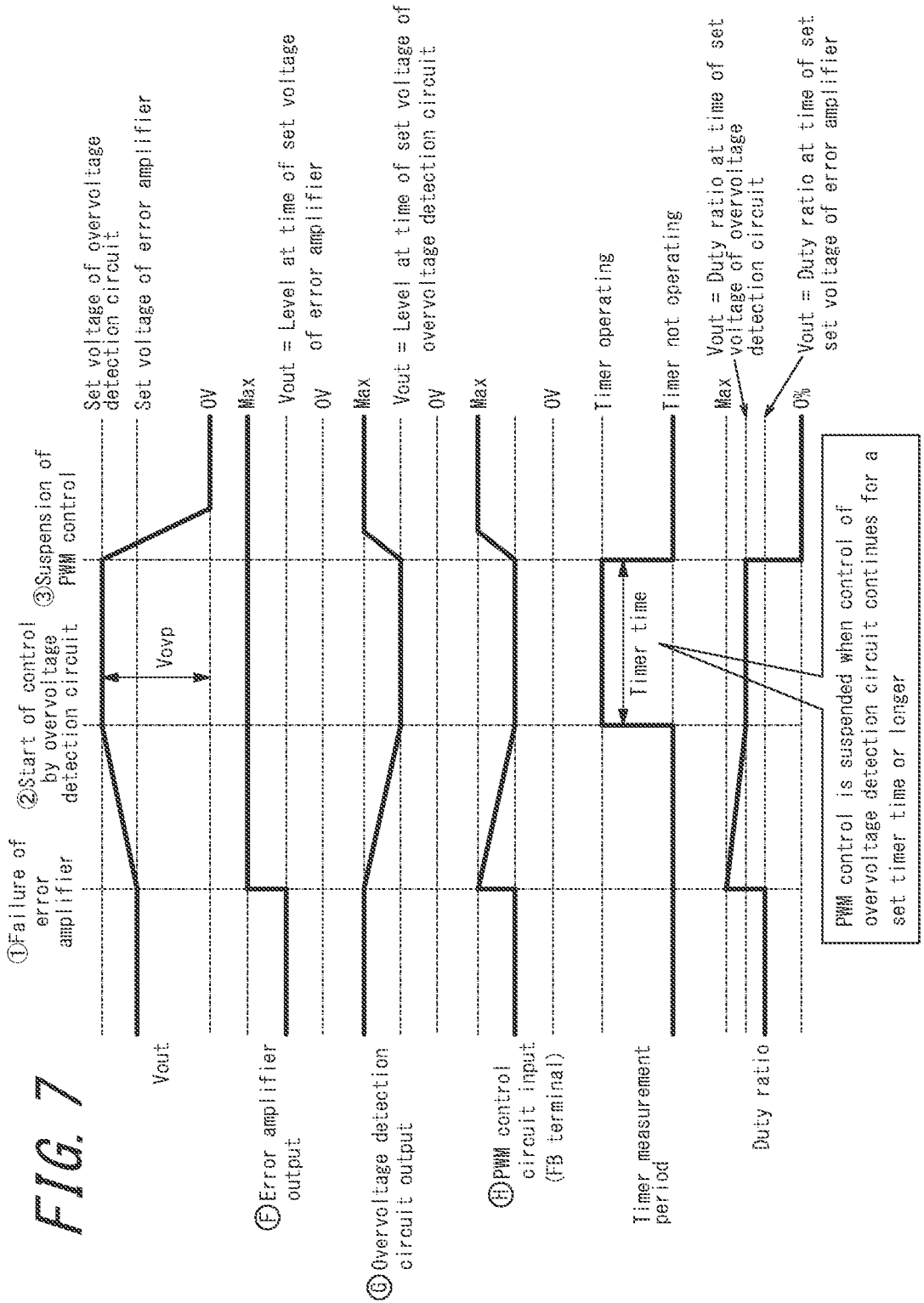
FIG. 7 illustrates an example of operations of the overvoltage protection circuit illustrated in FIG. 6.

Next, operations of the overvoltage protection circuit 42 are described with reference to FIG. 7. In order from the top, FIG. 7 illustrates the waveform of the output voltage $V_O$ of the converter 51, the waveform of the output voltage of the error amplifier 53 (the voltage at the position indicated by letter F in FIG. 6), the waveform of the output voltage of the overvoltage detection circuit 55 (the voltage at the position indicated by letter G in FIG. 6), the waveform of the voltage inputted to the FB terminal of the PWM control circuit 52 (the voltage at the position indicated by letter H in FIG. 6), the waveform indicating the measurement period of the timer circuit 59, and the duty ratio controlled by the PWM control circuit 52.

When the error amplifier 53 fails so that the level of the output voltage $V_{out}$ rises, the second command voltage outputted by the overvoltage detection circuit 55 becomes lower than the first command voltage outputted by the error amplifier 53. Consequently, the PWM control circuit 52 performs PWM control based on the second command voltage, and the rise in the output voltage $V_{out}$ can be suppressed.

When the second command voltage outputted by the overvoltage detection circuit 55 becomes equal to or less than a predetermined voltage, the timer circuit 59 starts measurement. The PWM control circuit 52 sets the duty ratio of the switching element to 0% when the period measured by the timer circuit 59 reaches the predetermined timer time. Upon the duty ratio becoming 0%, the output voltage $V_{out}$ of the converter 51 reduces to become zero.

As described above, the overvoltage protection circuit 42 of the second embodiment has the configuration of the overvoltage protection circuit 41 of the first embodiment with the addition of the monitoring circuit 58 that outputs the overvoltage detection signal when the second command voltage becomes equal to or less than a predetermined voltage and the timer circuit 59 that measures the period during which the monitoring circuit 58 continually outputs the overvoltage detection signal. The overvoltage protection circuit 42 automatically transitions the output voltage $V_{out}$ of the converter 51 to 0 V when the period measured by the timer circuit 59 exceeds a predetermined timer time.

The output of the overvoltage detection circuit 55 is monitored by the monitoring circuit 58 in the present embodiment. This enables the output of the converter 51 and the power supply apparatus 2 to be transitioned automatically to 0 V when the error amplifier 53 suffers overvoltage failure. Accordingly, a voltage exceeding the allowable input voltage level can be prevented from being applied to the load module 200 when failure occurs in the overvoltage detection circuit 55. This can further improve reliability as compared to the first embodiment.

Third Embodiment

Next, an overvoltage protection circuit and a power supply apparatus according to a third embodiment are described. The overvoltage due to failure of the error amplifier 53 can be suppressed in the first embodiment, as described above. Since there is no way to detect whether the error amplifier 53 has failed, however, the power supply apparatus 1 continues to operate. If the overvoltage detection circuit 55 fails so that the level of the output voltage $V_{out}$ rises in this state, then a voltage exceeding the allowable input voltage level might be applied to the load module 200 connected to the power supply apparatus 1. To address this problem, the present embodiment adds, to the configuration of the first embodiment, a function to notify a higher-level system that the power supply apparatus has fallen into an abnormal state.

Figure 8:
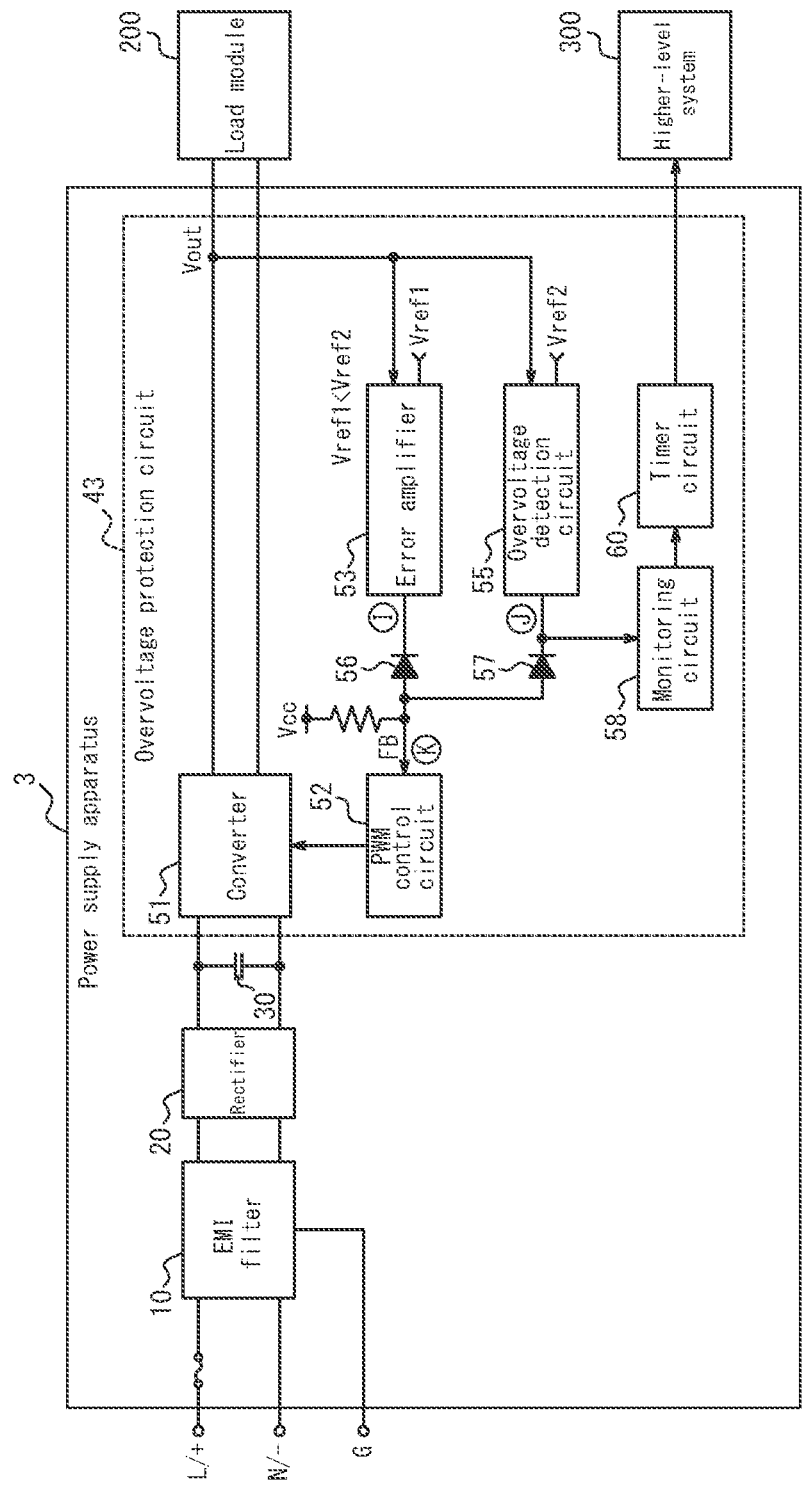
FIG. 8 illustrates an overvoltage protection circuit and a power supply apparatus according to a third embodiment.

FIG. 8 illustrates an overvoltage protection circuit and a power supply apparatus according to the third embodiment. As illustrated in FIG. 8, a power supply apparatus 3 includes an EMI filter 10, a rectifier 20, a smoothing capacitor 30, and an overvoltage protection circuit 43. The overvoltage protection circuit 43 includes a converter 51, a PWM control circuit 52, an error amplifier 53, an overvoltage detection circuit 55, semiconductor elements 56, 57, a monitoring circuit 58, and a timer circuit 60. The present embodiment differs from the first embodiment in that the overvoltage protection circuit 43 additionally includes the monitoring circuit 58 and the timer circuit 60, and the power supply apparatus 3 is connected to a higher-level system 300. The higher-level system 300 may be configured to include the timer circuit 60.

As in the second embodiment, the overvoltage detection circuit 55 outputs a second command voltage, for bringing an output voltage $V_{out}$ of the converter 51 (i.e. the output voltage of the power supply apparatus 3) closer to a second set voltage (overvoltage detection voltage $V_{ovp}$), to the semiconductor element 57 and the monitoring circuit 58.

As in the second embodiment, the monitoring circuit 58 monitors the second command voltage inputted from the overvoltage detection circuit 55. When the second command voltage becomes equal to or less than a predetermined voltage, the monitoring circuit 58 outputs a corresponding overvoltage detection signal (such as a high-level voltage signal) to the timer circuit 60.

As in the second embodiment, the timer circuit 60 measures (counts) the period during which the monitoring circuit 58 continually outputs the overvoltage detection signal. The timer circuit 60 warns an external system when the measured period reaches a predetermined timer time (count value). For example, the timer circuit 60 outputs a warning signal (such as a high-level voltage signal) to the higher-level system 300.

The higher-level system 300 notifies the user of an abnormality in the power supply apparatus 3 by the warning signal being inputted from the timer circuit 60. The higher-level system 300 may be a control system for a plant, such as a distributed control system (DCS) or a supervisory control and data acquisition (SCADA) system.

Figure 9:
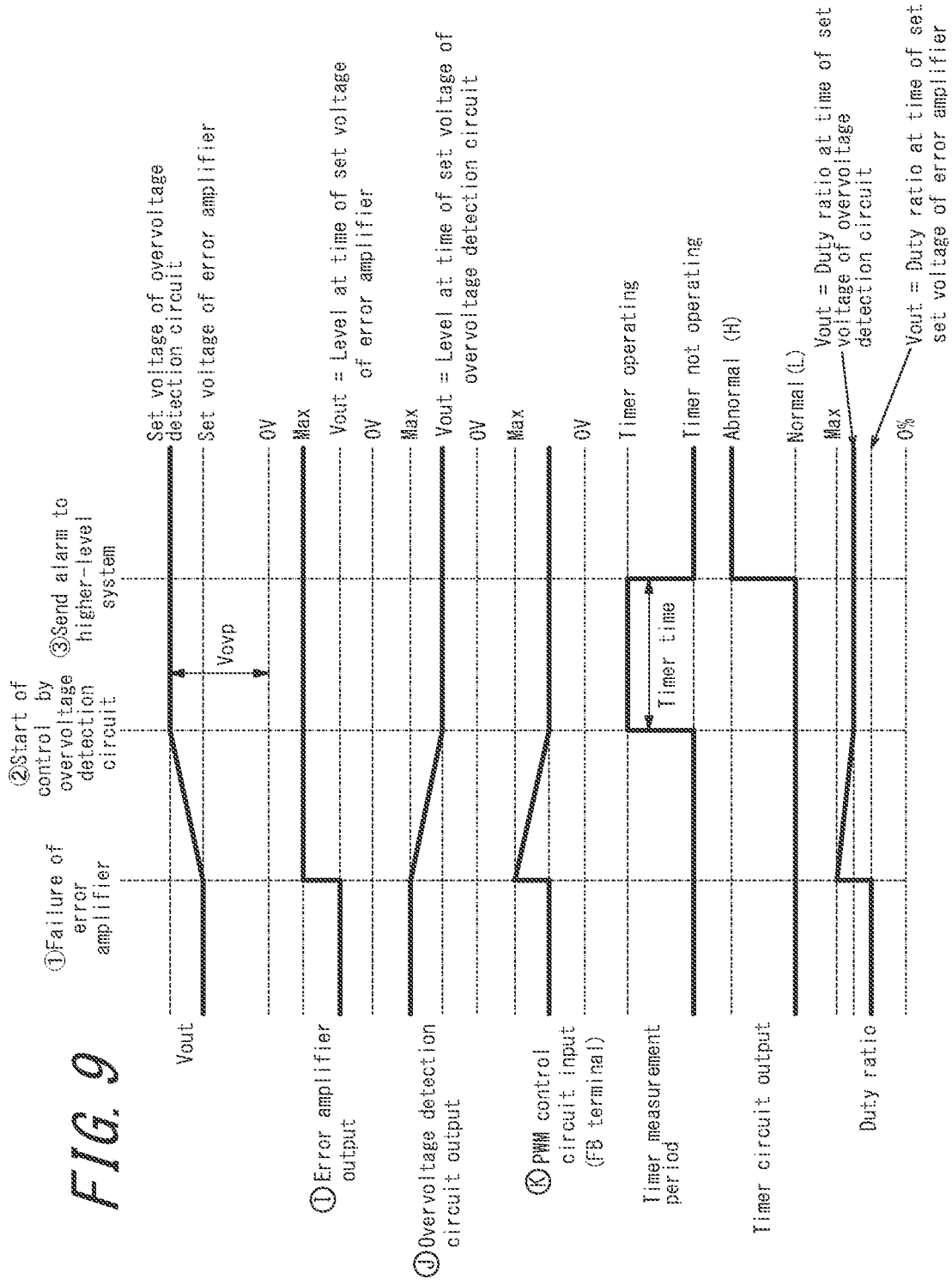
FIG. 9 illustrates an example of operations of the overvoltage protection circuit illustrated in FIG. 8.

Next, operations of the overvoltage protection circuit 43 are described with reference to FIG. 9. In order from the top, FIG. 9 illustrates the waveform of the output voltage $V_{out}$ of the converter 51, the waveform of the output voltage of the error amplifier 53 (the voltage at the position indicated by letter I in FIG. 8), the waveform of the output voltage of the overvoltage detection circuit 55 (the voltage at the position indicated by letter J in FIG. 8), the waveform of the voltage inputted to the FB terminal of the PWM control circuit 52 (the voltage at the position indicated by letter K in FIG. 8), the waveform indicating the measurement period of the timer circuit 60, and the duty ratio controlled by the PWM control circuit 52.

When the error amplifier 53 fails so that the level of the output voltage $V_{out}$ of the converter 51 rises, the second command voltage outputted by the overvoltage detection circuit 55 becomes lower than the first command voltage outputted by the error amplifier 53. Consequently, the PWM control circuit 52 performs PWM control based on the second command voltage, and the rise in the output voltage $V_{out}$ can be suppressed.

When the second command voltage outputted by the overvoltage detection circuit 55 becomes equal to or less than a predetermined voltage, the timer circuit 60 starts measurement.

When the period measured by the timer circuit 60 reaches the predetermined timer time, the timer circuit 60 outputs a warning signal to notify the higher-level system 300 of an abnormality in the power supply apparatus 3.

As described above, the overvoltage protection circuit 43 of the third embodiment has the configuration of the overvoltage protection circuit 41 of the first embodiment with the addition of the monitoring circuit 58 that outputs the overvoltage detection signal when the second command voltage becomes equal to or less than a predetermined voltage and the timer circuit 60 that measures the period during which the monitoring circuit 58 continually outputs the overvoltage detection signal. When the period measured by the timer circuit 60 reaches the predetermined timer time, the overvoltage protection circuit 43 warns the external higher-level system 300.

The output of the overvoltage detection circuit 55 is monitored by the monitoring circuit 58 in the present embodiment. This enables the higher-level system 300 to be notified of failure of the power supply apparatus 3 when the error amplifier 53 suffers overvoltage failure. Accordingly, reliability can be further improved as compared to the first embodiment.

Modification to Third Embodiment

Furthermore, the third embodiment may be modified as follows. After the timer circuit 60 outputs the warning signal to the higher-level system 300, the monitoring circuit 58 may newly measure the period during which the monitoring circuit 58 continually outputs the overvoltage detection signal, and when the measured period reaches a predetermined timer time, the timer circuit 60 may output an operation suspension signal (such as a high-level voltage signal) to the SD terminal of the PWM control circuit 52.

When the operation suspension signal is inputted to the SD terminal from the timer circuit 60, the PWM control circuit 52 outputs a PWM signal that sets the duty ratio of the switching element in the converter 51 to 0%, so that the output voltage of the converter 51 becomes 0 V. The remaining configuration is the same as that of the third embodiment. In the present modification, the higher-level system 300 can be notified of failure of the power supply apparatus 3 when the error amplifier 53 suffers overvoltage failure, and when the output voltage $V_{out}$ is in the state of the overvoltage detection voltage $V_{ovp}$ for longer than a predetermined period after the higher-level system 300 is notified of failure of the error amplifier 53, the output of the converter 51 and the power supply apparatus 3 can automatically be transitioned to 0 V.

Fourth Embodiment

Next, an overvoltage protection circuit and a power supply apparatus according to a fourth embodiment are described. Overvoltage due to failure of the error amplifier 53 can be suppressed in the first embodiment, but the power supply apparatus 1 continues to operate with the level of the output voltage $V_{out}$ at the overvoltage detection voltage $V_{ovp}$. The continuation of this state increases the failure risk of the power supply apparatus 1 due to an increase in the power consumption of the power supply apparatus 1 and the failure risk of the load module 200 due to increased voltage applied to the load module 200. Therefore, the present embodiment adds a function, to the configuration of the first embodiment, to reduce the level of the output voltage $V_{out}$ again from $V_{ovp}$ when overvoltage occurs.

Figure 10:
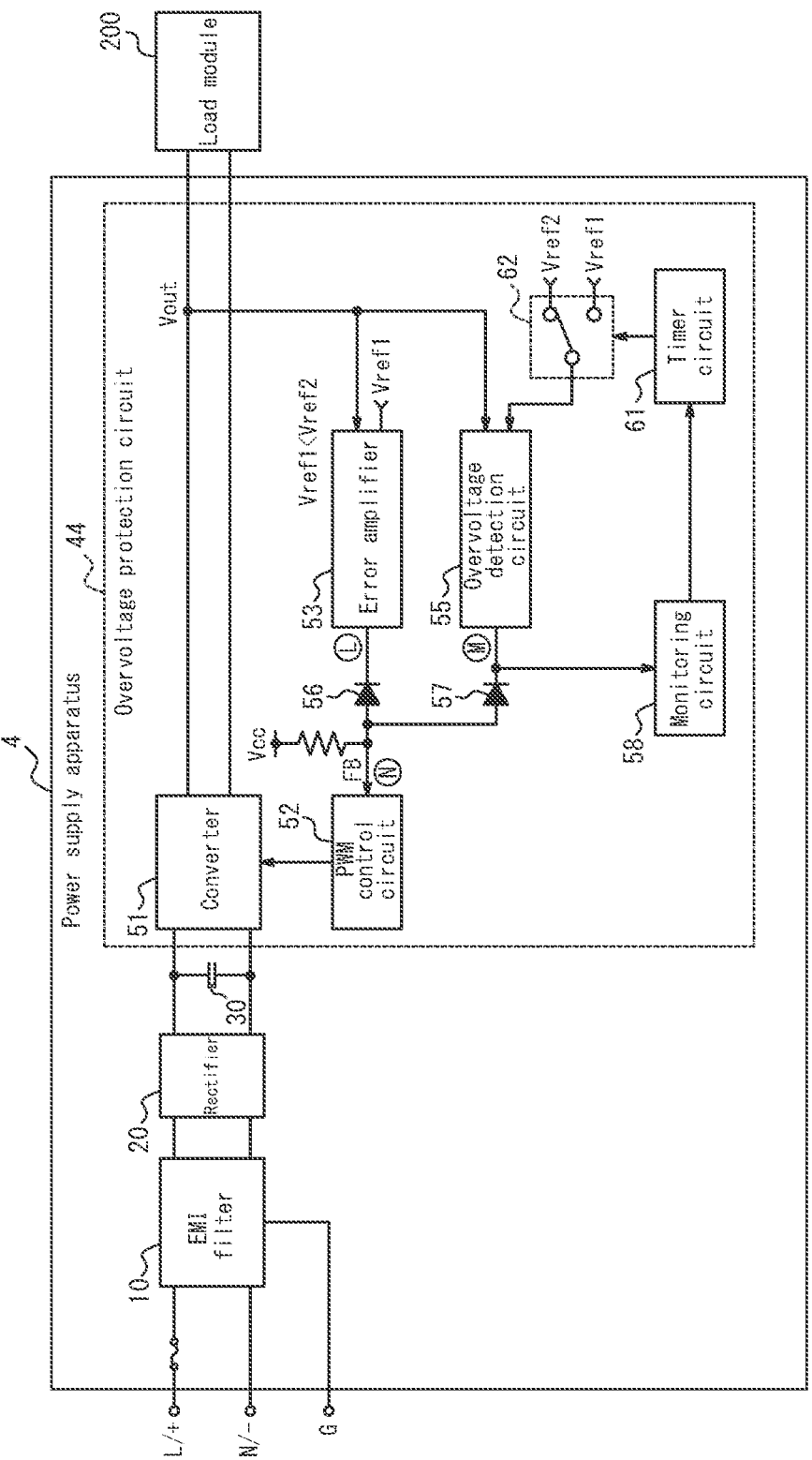
FIG. 10 illustrates an overvoltage protection circuit and a power supply apparatus according to a fourth embodiment.

FIG. 10 illustrates an overvoltage protection circuit and a power supply apparatus according to the fourth embodiment. As illustrated in FIG. 10, a power supply apparatus 4 includes an EMI filter 10, a rectifier 20, a smoothing capacitor 30, and an overvoltage protection circuit 44. The overvoltage protection circuit 44 includes a converter 51, a PWM control circuit 52, an error amplifier 53, an overvoltage detection circuit 55, semiconductor elements 56, 57, a monitoring circuit 58, a timer circuit 61, and a switch 62. The present embodiment differs from the first embodiment in that the overvoltage protection circuit 44 additionally includes the monitoring circuit 58, the timer circuit 61, and the switch 62. The control of the overvoltage detection circuit 55 also differs.

As in the second embodiment, the monitoring circuit 58 monitors the second command voltage inputted from the overvoltage detection circuit 55. When the second command voltage becomes equal to or less than a predetermined voltage, the monitoring circuit 58 outputs a corresponding overvoltage detection signal (such as a high-level voltage signal) to the timer circuit 61.

Based on an instruction from the timer circuit 61, the switch 62 selects one of the reference voltage $V_{ref1}$ and the reference voltage $V_{ref2}$, which is higher than the reference voltage $V_{ref1}$, and outputs the selected voltage to the overvoltage detection circuit 55. The switch 62 selects the reference voltage $V_{ref2}$ in an initial state.

As in the second embodiment, the timer circuit 61 measures (counts) the period during which the monitoring circuit 58 continually outputs the overvoltage detection signal. The timer circuit 61 instructs the switch 62 to select the reference voltage $V_{ref1}$ when the measured period reaches a predetermined timer time (count value).

The overvoltage detection circuit 55 outputs a command voltage for bringing the voltage inputted from the converter 51 ($V_{out}$ when the output voltage $V_{out}$ of the converter 51 is used as is as the input voltage of the overvoltage detection circuit 55, and the result of dividing $V_{out}$ when the output voltage $V_{out}$ of the converter 51 is divided and used as the input voltage of the overvoltage detection circuit 55) closer to whichever of the reference voltage $V_{ref2}$ and the reference voltage $V_{ref1}$ was selected by the switch 62. In other words, when the switch 62 has selected the reference voltage $V_{ref2}$, the overvoltage detection circuit 55 outputs a second command voltage for bringing the output voltage $V_{out}$ of the converter 51 closer to a second set voltage (overvoltage detection voltage $V_{ovp}$) that is higher than a first set voltage. When the switch 62 has selected the reference voltage $V_{ref1}$ due to the period measured by the timer circuit 61 having reached the predetermined timer time, the overvoltage detection circuit 55 outputs a third command voltage for bringing the output voltage $V_{out}$ of the converter 51 closer to a first set voltage $V_{normal}$.

Next, operations of the overvoltage protection circuit 44 are described with reference to FIG. 11. In order from the top, FIG. 11 illustrates the waveform of the output voltage $V_{out}$ of the converter 51, the waveform of the output voltage of the error amplifier 53 (the voltage at the position indicated by letter L in FIG. 10), the waveform of the output voltage of the overvoltage detection circuit 55 (the voltage at the position indicated by letter M in FIG. 10), the waveform of the voltage inputted to the FB terminal of the PWM control circuit 52 (the voltage at the position indicated by letter N in FIG. 10), the waveform indicating the measurement period of the timer circuit 61, the waveform indicating the selection of the switch 62, and the duty ratio controlled by the PWM control circuit 52.

When the error amplifier 53 fails so that the level of the output voltage $V_{out}$ of the converter 51 rises, the second command voltage outputted by the overvoltage detection circuit 55 becomes lower than the first command voltage outputted by the error amplifier 53. The PWM control circuit 52 then starts performing PWM control based on the second command voltage, and the rise of the output voltage $V_{out}$ is suppressed at the level of the voltage $V_{ovp}$.

When the second command voltage outputted by the overvoltage detection circuit 55 becomes equal to or less than a predetermined voltage, the timer circuit 61 starts time measurement.

When the period measured by the timer circuit 61 reaches a predetermined timer time, the switch 62 switches the selected reference voltage from $V_{ref2}$ to $V_{ref1}$. The PWM control circuit 52 then starts performing PWM control based on the third command voltage, and the level of the output voltage $V_{out}$ drops to the level of the voltage $V_{normal}$ before the failure.

As described above, the overvoltage protection circuit 44 of the fourth embodiment has the configuration of the overvoltage protection circuit 41 of the first embodiment with the addition of the monitoring circuit 58 that outputs the overvoltage detection signal when the second command voltage becomes equal to or less than a predetermined voltage and the timer circuit 61 that measures the period during which the monitoring circuit 58 continually outputs the overvoltage detection signal. Furthermore, when the period measured by the timer circuit 61 reaches the predetermined timer time, the overvoltage detection circuit 55 outputs the third command voltage for bringing the output voltage $V_{out}$ of the converter 51 closer to the first set voltage $V_{normal}$. The overvoltage protection circuit 44 controls the converter 51 based on the first command voltage and one of the second command voltage and the third command voltage.

The output of the overvoltage detection circuit 55 is monitored by the monitoring circuit 58 in the present embodiment. This enables the level of the output voltage $V_{out}$ of the converter 51 to be suppressed to the voltage $V_{ovp}$ when the error amplifier 53 suffers overvoltage failure, and when the predetermined timer time subsequently elapses, the level of the output voltage $V_{out}$ of the converter 51 can be returned to the voltage $V_{normal}$. Accordingly, the failure risk of the power supply apparatus 4 and the load module 200 can be further reduced as compared to the first embodiment, further increasing reliability. As in the third embodiment, the power supply apparatus 4 may be connected to an external higher-level system in the present embodiment as well, and when the period measured by the timer circuit 61 reaches the predetermined timer time, the higher-level system may be warned. The user can thus be notified of failure of the error amplifier 53, thereby even further increasing reliability.

The present disclosure is not limited to the configurations specified in the above embodiments, and a variety of modifications may be made without departing from the scope of the claims. For example, the functions and the like included in the various components may be reordered in any logically consistent way. Furthermore, components may be combined into one or divided.

The invention claimed is:

1. An overvoltage protection circuit comprising:
   an error amplifier configured to input an output voltage of a converter and a first set voltage, and output a first command voltage to a pulse width modulation (PWM) control circuit for keeping the output voltage of the converter closer to the first set voltage than a second set voltage; and
   an overvoltage detection circuit configured to input the output voltage of the converter and the second set voltage higher than the first set voltage, and output a second command voltage to the PWM control circuit for keeping the output voltage of the converter closer to the second set voltage than the first set voltage;
   wherein the PWM control circuit controls the converter based on the first command voltage and the second command voltage.

2. The overvoltage protection circuit of claim 1, further comprising:
   a monitoring circuit configured to output an overvoltage detection signal when the second command voltage becomes equal to or less than a predetermined voltage; and
   a timer circuit configured to measure a period during which the monitoring circuit continually outputs the overvoltage detection signal;
   wherein the overvoltage protection circuit brings the converter to an emergency stop when the period measured by the timer circuit reaches a predetermined timer time.

3. The overvoltage protection circuit of claim 1, further comprising:
   a monitoring circuit configured to output an overvoltage detection signal when the second command voltage becomes equal to or less than a predetermined voltage; and a timer circuit configured to measure a period during which the monitoring circuit continually outputs the overvoltage detection signal;

wherein the overvoltage protection circuit warns an external system when the period measured by the timer circuit reaches a predetermined timer time.

4. The overvoltage protection circuit of claim 1, further comprising:

a monitoring circuit configured to output an overvoltage detection signal when the second command voltage becomes equal to or less than a predetermined voltage; and a timer circuit configured to measure a period during which the monitoring circuit continually outputs the overvoltage detection signal;

wherein the overvoltage detection circuit is configured to output a third command voltage for bringing the output voltage of the converter closer to the first set voltage when the period measured by the timer circuit reaches a predetermined timer time; and wherein the overvoltage protection circuit controls the converter based on the first command voltage and one of the second command voltage and the third command voltage.

5. The overvoltage protection circuit of claim 1, wherein an output terminal of the error amplifier is connected to one terminal of a first semiconductor element that has a rectifying function, an output terminal of the overvoltage detection circuit is connected to one terminal of a second semiconductor element that has a rectifying function, and another terminal of the first semiconductor element and another terminal of the second semiconductor element are connected to each other; and wherein the overvoltage protection circuit controls the converter based on a voltage of the another terminal of the first semiconductor element and the another terminal of the second semiconductor element.

6. The overvoltage protection circuit of claim 1, wherein an output terminal of the error amplifier is connected to one terminal of a light-emitting element of a first semiconductor element, an output terminal of the overvoltage detection circuit is connected to one terminal of a light-emitting element of a second semiconductor element, and an output terminal of a light-receiving element of the first semiconductor element and an output terminal of a light-receiving element of the second semiconductor element are connected to each other; and wherein the overvoltage protection circuit controls the converter based on a voltage of the output terminal of the first semiconductor element and the output terminal of the second semiconductor element.

7. A power supply apparatus comprising the overvoltage protection circuit of claim 1.

8. The overvoltage protection circuit of claim 1, wherein when a level of the output voltage of the converter reaches the second set voltage, the PWM control circuit outputs a PWM signal to change a duty ratio of a switching element of the converter based on an output voltage of the overvoltage detection circuit.

* * * * *